(12) United States Patent
Vandeweerd et al.

(10) Patent No.: US 10,027,850 B2
(45) Date of Patent: Jul. 17, 2018

(54) SECURING IMAGE DATA DETECTED BY AN ELECTRONIC DEVICE

(71) Applicant: BLACKBERRY LIMITED, Waterloo (CA)

(72) Inventors: Sean Vandeweerd, Etobicoke (CA); Sanjay Nathwani, Mississauga (CA); Kian Marandi, Toronto (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 0 days.

(21) Appl. No.: 15/132,606

(22) Filed: Apr. 19, 2016

(65) Prior Publication Data
US 2017/0302822 A1 Oct. 19, 2017

(51) Int. Cl.
| H04N 5/76 | (2006.01) |
| H04N 5/222 | (2006.01) |
| H04N 1/44 | (2006.01) |
| H04N 5/232 | (2006.01) |
| H04N 1/21 | (2006.01) |
| G06F 21/44 | (2013.01) |
| H04N 1/32 | (2006.01) |

(Continued)

(52) U.S. Cl.
CPC ........... *H04N 1/4433* (2013.01); *G06F 21/44* (2013.01); *G06F 21/645* (2013.01); *G06T 1/0085* (2013.01); *H04N 1/2137* (2013.01); *H04N 1/32352* (2013.01); *H04N 1/444* (2013.01); *H04N 1/4493* (2013.01); *H04N 5/23293* (2013.01)

(58) Field of Classification Search
CPC ............. H04N 5/23293; H04N 1/4433; H04N 1/2137; H04N 1/4493; H04N 1/444; H04N 1/32352; G06F 21/44; G06F 21/645

See application file for complete search history.

(56) References Cited

U.S. PATENT DOCUMENTS

| 7,222,235 B1 * | 5/2007 | Mitsui .................. G06F 17/211 380/28 |
| 7,346,185 B2 | 3/2008 | Grossman et al. |
| 9,022,292 B1 | 5/2015 | Van Der Merwe et al. |

(Continued)

FOREIGN PATENT DOCUMENTS

| EP | 1253555 A2 | 10/2002 |
| JP | H07 121293 | 5/1995 |

OTHER PUBLICATIONS

EPO, Extended European Search Report relating to EP application No. 17161289.8 dated Jul. 26, 2017.

(Continued)

*Primary Examiner* — Lin Ye
*Assistant Examiner* — John H Morehead, III
(74) *Attorney, Agent, or Firm* — Rowand LLP

(57) ABSTRACT

A method and device for securing image data detected by an electronic device is provided. The electronic may include a camera. In one aspect, a method includes: capturing image data using the camera; based on the captured image data, detecting a security marker displayed by a display device, the security marker being periodically displayed to be undetectable by a human eye that is viewing the display device; and in response to determining that the security marker is detected by the electronic device, applying a security policy to the image data captured by the electronic device.

19 Claims, 13 Drawing Sheets

(51) Int. Cl.
*G06F 21/64* (2013.01)
*G06T 1/00* (2006.01)

(56) References Cited

U.S. PATENT DOCUMENTS

| | | | | |
|---|---|---|---|---|
| 9,607,131 | B2* | 3/2017 | Winograd | G06F 21/10 |
| 2001/0012019 | A1* | 8/2001 | Yamazaki | G06T 1/005 |
| | | | | 345/639 |
| 2003/0223614 | A1* | 12/2003 | Robins | G06T 1/0071 |
| | | | | 382/100 |
| 2004/0184612 | A1* | 9/2004 | Kohiyama | G06T 1/0071 |
| | | | | 380/217 |
| 2006/0086796 | A1* | 4/2006 | Onogi | G06K 7/10712 |
| | | | | 235/454 |
| 2006/0239503 | A1* | 10/2006 | Petrovic | H04L 9/002 |
| | | | | 382/100 |
| 2008/0089552 | A1 | 4/2008 | Nakamura et al. | |
| 2009/0226101 | A1 | 9/2009 | Lessing | |
| 2010/0067692 | A1 | 3/2010 | Schultz | |
| 2010/0228632 | A1 | 9/2010 | Rodriguez | |
| 2011/0128384 | A1 | 6/2011 | Tiscareno et al. | |
| 2011/0216207 | A1 | 9/2011 | Kazama | |
| 2012/0072731 | A1* | 3/2012 | Winograd | G06F 21/10 |
| | | | | 713/176 |
| 2012/0260307 | A1* | 10/2012 | Sambamurthy | G06F 21/554 |
| | | | | 726/1 |
| 2014/0003653 | A1 | 1/2014 | Walker et al. | |
| 2015/0023669 | A1 | 1/2015 | Jiang | |
| 2016/0104408 | A1* | 4/2016 | Kim | G09G 3/36 |
| | | | | 345/690 |
| 2016/0253508 | A1* | 9/2016 | Song | G06F 21/554 |
| | | | | 726/29 |
| 2016/0357947 | A1* | 12/2016 | Cohen | G06F 3/013 |

OTHER PUBLICATIONS

EPO, Extended European Search Report relating to EP application No. 17161332.6 dated Jul. 10, 2017.
Carpenter, John, "They Live", youtube, May 10, 2013, p. 2, pp., XP054977474, Retrieved from the Internet: URL: https://www.youtube.com/watch?v=QVgl1HOxpj8 [retrieved on Jun. 23, 2017], p. 1-p. 2.
USPTO, Office Action relating to U.S. Appl. No. 15/132,572 dated Nov. 28, 2017.

* cited by examiner

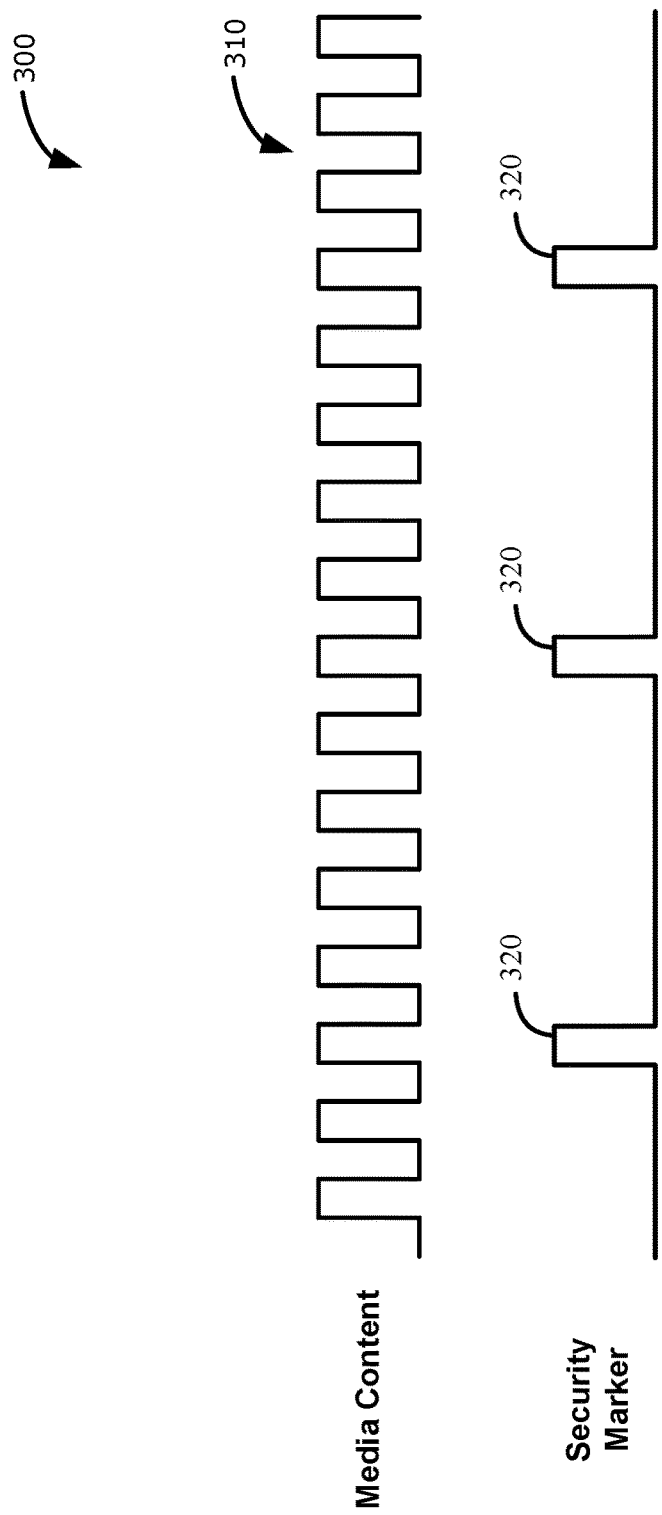

SECURING IMAGE DATA DETECTED BY AN ELECTRONIC DEVICE

The present disclosure relates generally to electronic devices having cameras and, more particularly, to methods and devices for securing image data detected by an electronic device.

BACKGROUND

Electronic devices having cameras are convenient to carry and are capable of capturing images of objects and environments. As long as a user may operate the electronic device, the user may capture images of objects and the surrounding environment. Electronic devices having cameras are often equipped with at least one image sensor. The electronic device may capture image data by detecting light incident on an image sensor and converting the detected light into electrical signals.

The use of electronic devices in confidential environments may pose a security risk. Confidential environments can include engineering laboratories having laboratory equipment displaying confidential information or office environments having computer screens displaying private or non-public information. Some computer systems operating in confidential environments may allow administrators in charge of data protection to disable features to prevent leakage of information or data. For example, copy and paste functions or screenshot functions may be disabled on computer systems. Further, data sharing mechanisms may be disabled or restricted. Administrators in charge of data protection may not be able to control data leakage caused when users of electronic having cameras purport to capture images of display devices showing confidential or private data.

BRIEF DESCRIPTION OF THE DRAWINGS

Reference will now be made, by way of example, to the accompanying drawings which show example embodiments of the present application, and in which:

FIG. 3 is an illustration of a sequence diagram for providing media content and a security marker by a display device in accordance with example embodiments of the present disclosure;

Like reference numerals are used in the drawings to denote like elements and features.

DETAILED DESCRIPTION OF EXAMPLE EMBODIMENTS

Figure 1:
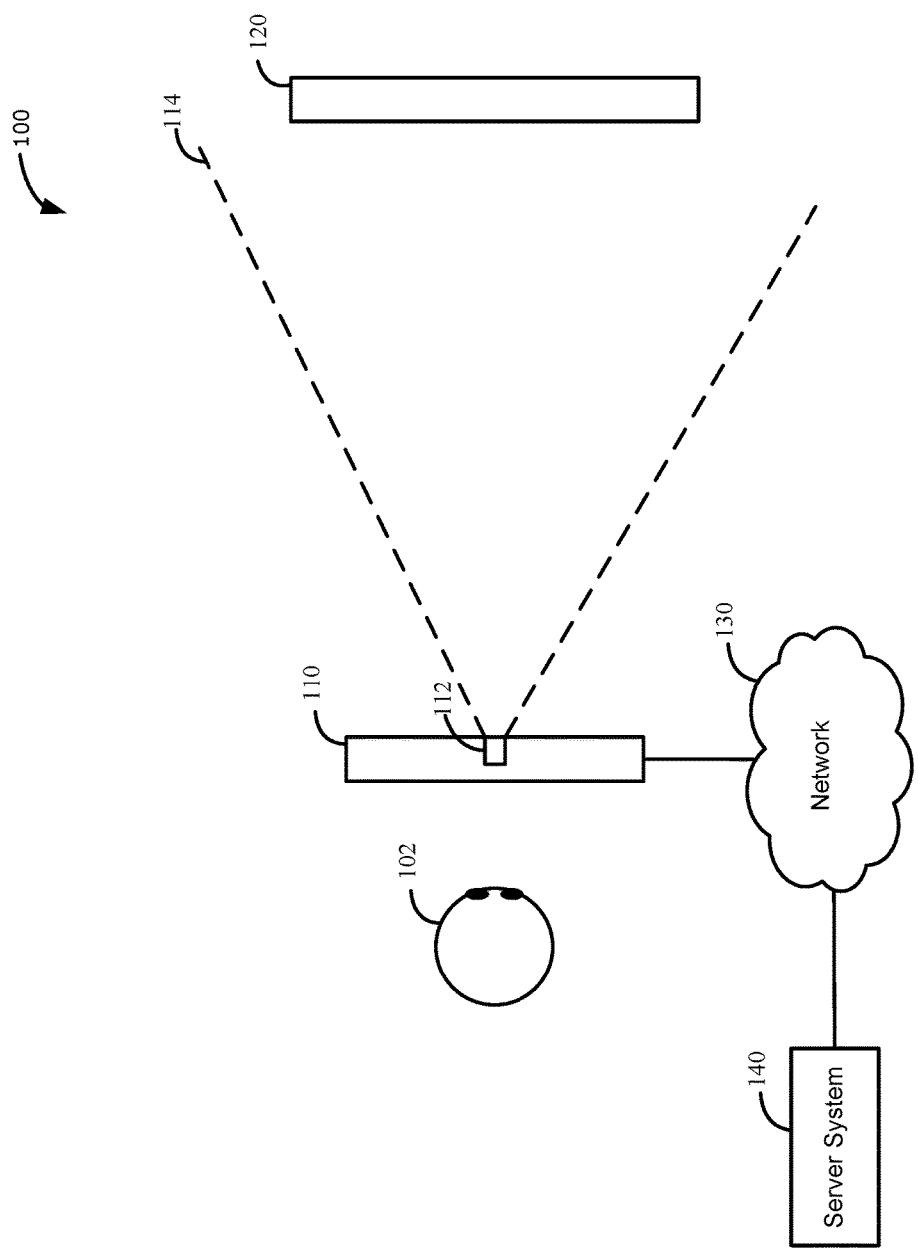
FIG. 1 is a schematic illustration of an electronic device capturing image data in accordance with example embodiments of the present disclosure.

In one example aspect, the present disclosure describes a method of securing image data detected by an electronic device. The method includes capturing image data using the electronic device. Based on the captured image data, the method includes detecting a security marker displayed by a display device. The security marker may be periodically displayed to be undetectable by a human eye that is viewing the display device. In response to determining that the security marker is detected by the electronic device, the method also includes applying a security policy to the image data captured by the electronic device.

In another aspect, an electronic device is described. The electronic device includes a camera and a memory device. The electronic device also includes a processor coupled to the camera and the memory device. The processor may be configured to capture image data using the camera. Based on the captured image data, the processor may be configured to detect a security marker displayed by a display device. The security marker may be periodically displayed to be undetectable by a human eye that is viewing the display device. In response to determining that the security marker is detected by the electronic device, the processor may be configured to apply a security policy to the image data captured by the camera.

In yet a further aspect, a non-transitory computer-readable storage medium comprising processor-executable instructions is described. The instructions, when executed by a processor of the electronic device, cause the processor of the electronic device to capture image data using the electronic device. Based on the captured image data, the instructions cause the processor to detect a security marker displayed by a display device. The security marker may be periodically displayed to be undetectable by a human eye that is viewing the display device. In response to determining that the security marker is detected by the electronic device, the instructions cause the processor to apply a security policy to the image data captured by the electronic device.

In yet a further aspect, the present disclosure describes non-transitory computer-readable media storing computer-executable program instructions which, when executed, configure a processor to perform the described methods.

Other aspects and features of the present application will be understood by those of ordinary skill in the art from a review of the following description of examples in conjunction with the accompanying figures.

In the present application, the term "and/or" is intended to cover all possible combination and sub-combinations of the listed elements, including any one of the listed elements alone, any sub-combination or all of the elements, and without necessarily excluding additional elements.

In the present application, the term "a processor" is intended to include both a single processor and also a plurality of processors coupled to one another which distribute operations among the processors.

Reference is now made to FIG. 1, which is a schematic illustration of an electronic device 110 capturing image data. An environment 100 is illustrated where an electronic device 110 is being operated by a user 102. The electronic device 110 may be any suitable electronic device that may be held and operated by the user 102 in order to interact with the environment 100.

In some embodiments, the electronic device 110 may include a camera 112 that is capable of capturing image data, such as images, in the form of still photo and/or motion data. The electronic device 110 may be used to observe the environment 100 within a field of view 114. The field of view 114 may be a scene that is observed from the perspective of the electronic device 110 through the camera 112. The electronic device 110 may generate image data in the form of electronic signals produced by an image sensor (not shown) associated with the camera 112. In some embodiments, the camera may have a lens for focusing a scene or object being photographed onto the image sensor.

In some embodiments, the electronic device 110 may be used to observe the environment within a field of view 114. The field of view 114 may include one or more display devices 120. That is, the electronic device 110 may observe content displayed on the display device 120 that is within the field of view 114.

Although the electronic device 110 is illustrated as being operated adjacent a viewing surface of a display device 120, in some embodiments, the electronic device 110 may be operated in any other position relative to the viewing surface of the display device 120. For example, the electronic device 110 may be operated such that the field of view 114 of the camera 112 originates from an off-center position relative the viewing surface of the display device 120.

In some embodiments, the electronic device 110 may alter the breadth of the field of view 114. In some embodiments, the electronic device 110 may be positioned at various distances from the display device 120. For example, a user 102 may operate the electronic device 110 and may physically position the electronic device 110 to be nearer or farther away from the display device 120. When the display device 120 is within the field of view 114, the displayed contents of the display device 120 may occupy a portion of a captured image. In some embodiments, when the electronic device 110 is nearer to the display device 120, the contents of the display device 120 may occupy a larger portion of the captured image. When the electronic device 110 is further away from the display device 120, the contents of the display device 120 may occupy a smaller portion of the captured image.

In some embodiments, the electronic device 110 may alter the breadth of the field of view 114 by adjusting a camera lens position. A camera lens may focus a scene or object onto an image sensor of a camera 112. For example, the electronic device 110 may adjust a camera lens position to provide optical zoom. Accordingly, the display contents of the display device 120 may occupy a larger portion of the captured image. Alternatively, the electronic device 110 may also adjust a camera lens position to provide a wider field of view. Correspondingly, the display contents of the display device 120 may occupy a smaller portion of the captured image.

In some embodiments, the electronic device 110 may be a mobile communication device and the electronic device 110 may be portable and easily moved from one physical location to a different physical location. In some embodiments, the electronic device 110 may be configured to be positioned in a fixed location and may be configured to alter a field of view 114 by adjusting a camera lens position.

In some embodiments, the electronic device 110 may be a multi-mode communication device configured for data and/or voice communication, such as a smartphone. In some embodiments, the electronic device 110 may be a wearable computer, such as a virtual reality apparatus enabling a user 102 to interact with the environment 100, wearable camera lenses, or similar type devices. In some embodiments, the electronic device 110 may be a tablet computer, a personal digital assistant (PDA), or any other computer system that may be operable by a user. The electronic device 110 may take other forms apart from those specifically listed above.

In some embodiments, the display device 120 may show a series of images at a high frequency. For example, the display device 120 may be a liquid crystal display (LCD), light-emitting diode (LED) display, a cathode-ray tube (CRT) display, organic light-emitting diode (OLED) display, or any other display technology capable of showing a series of images to a user 102. In some embodiments, the display device 120 may display a series of images at a fixed frequency or a variable frequency. In some embodiments, the frequency at which a series of images is displayed may be referred to as a refresh rate of the display device 120.

In some embodiments, the display device 120 may be a television. For example, a television may receive signals being broadcast by a television network provider and may process the received signals and display the signals on a television screen. In some embodiments, the display device 120 may be a computer monitor or a computer laptop screen. In some embodiments, the display device 120 may be a display screen of another electronic device 110.

Figure 2:
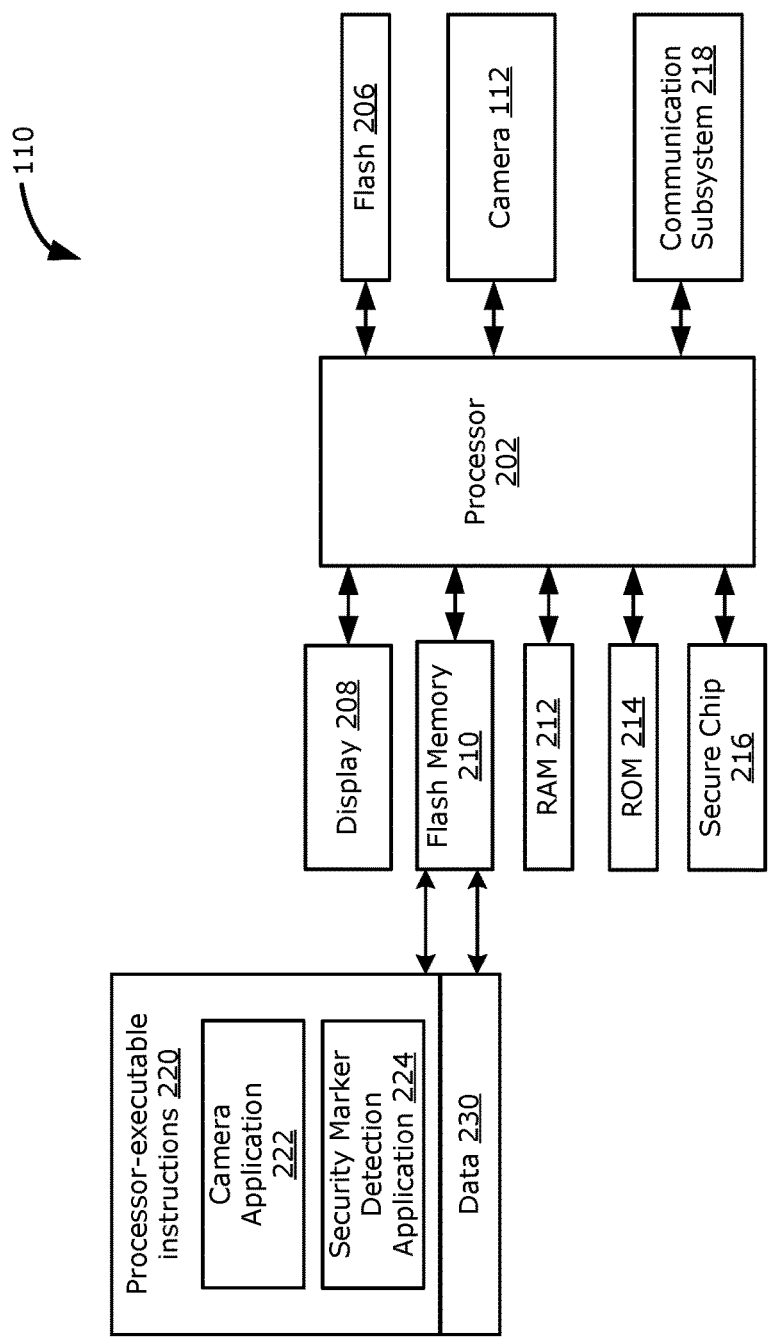
FIG. 2 is a block diagram illustrating an example electronic device in accordance with example embodiments of the present disclosure.

In some embodiments, the electronic device 110 may include a communication subsystem 218 (illustrated in FIG. 2). The communication subsystem 218 may include a receiver, a transmitter and associated components, such as one or more antenna elements, local oscillators, and a processing module such as a digital signal processor. The electronic device 110 may communicate via a network 130 with one or more devices, such as a server system 140. In some embodiments, the network 130 may be a wireless network. In some embodiments, the network 130 may be a wired network. In some embodiments, the network 130 may include both wireless and wired network portions.

In some embodiments, the server system 140 may be a computer system for administering a network of electronic devices 110. For example, the server system 140 may be a centralized system for administrators or other agents in charge of data protection to send and receive communication to and from electronic devices 110. For example, the server system 140 may be used to monitor the operation of electronic devices 110. In some embodiments, the server system 140 may send software updates to the network of electronic devices 110. In some embodiments, the server system 140 may receive messages from electronic devices 110 relating to the operating state of the electronic devices 110. As will be described herein, in some embodiments, the server system 140 may receive messages from an electronic device 110 when an electronic device has captured an image of confidential data. An administrator operating the server system 140 may subsequently apply a security policy in response to receiving a message indicating that the electronic device 110 has captured an image of confidential data.

Reference is now made to FIG. 2, which is a block diagram illustrating an example electronic device 110. The electronic device includes a controller including at least one processor 202 (such as a microprocessor) which controls the overall operation of the electronic device 110. The processor 202 may be communicatively coupled to the device subsystems such as one or more output interfaces (such as a display 208, a flash 206, and/or a speaker (not shown)), one or more input interfaces (such as a camera 112, control buttons (not shown), a touch-sensitive overlay (not shown) associated with a touchscreen display, and/or other input interfaces), and memory (such as flash memory 210, random access memory (RAM) 212, read only memory (ROM) 214, a secure chip 216, etc.).

In some embodiments, the display 208 may function as a viewfinder. For example, when a camera 112 of the electronic device 110 is active, the display 208 may provide a preview of a field of view 114 as seen from the perspective of the camera 112. In some embodiments, the display 208 may be used to provide a user 102 with a preview of captured images or images that have been stored in any of the memory devices.

The electronic device 110 may include a camera 112 capable of capturing image data, such as images, in the form of still photo and/or motion data. The image data may be generated in the form of an electronic signal which is produced by an image sensor associated with the camera 112. For example, in some embodiments, the image sensor associated with the camera 112 may be a complementary metal-oxide-semiconductor (CMOS) sensor. In other embodiments, the image sensor associated with the camera 112 may be a charge-coupled device (CCD) sensor. In some embodiments, an adjustable camera lens may focus a scene or object onto the image sensor to capture imaged content.

In some embodiments, the frame rate of an image sensor is a measure of how many times a full pixel array can be read in a given period of time. In some examples, the given period of time may be one second. For example, image sensors may have a frame rate of 24 to 30 frames per second.

In some embodiments, the image sensor associated with the camera 112 may be unable to capture a full image or retrieve image data from the full pixel array of the image sensor at one exact point in time. Accordingly, in some embodiments, an image sensor may progressively scan a scene (e.g., top to bottom or side to side) to retrieve a captured image. For example, the image sensors may capture image data including multiple image frames and generate a full image based on the multiple image frames. That is, each of the multiple image frames may contain a portion of the full image and the processor 202 may generate a full image based on the multiple image frames. In some embodiments, the image sensor associated with the camera 112 may capture a full image or retrieve image data from the full pixel array of the image sensor at one exact point in time.

The electronic device 110 may store data 230 in an erasable persistent memory, which in one example is the flash memory 210. In some embodiments, the data 230 includes image data generated by the camera 112.

The processor 202 may operate under stored program control and executes processor-executable instructions 220 stored in memory such as persistent memory, for example, in the flash memory 210. The processor-executable instructions 220 or parts thereof may be temporarily loaded into volatile memory such as the RAM 212. The RAM 212 may be used for storing runtime data variables and other types of data or information. Although specific functions are described for various types of memory, this is merely one example. It will be appreciated that a different assignment of functions to types of memory could also be used.

The processor 202 may be communicatively coupled to the camera 112 to allow the processor 202 to receive electronic signals representing image data from the camera 112. The processor 202 may also be communicatively coupled to the flash 206 to allow the processor 202 to control the flash 206.

In some embodiments, the processor-executable instructions 220 may include one or more camera applications 222 or software modules which are configured to control the camera 112 and the flash 206. The camera application 222 may, for example, be configured to provide a viewfinder on the display 208 by displaying, in real time or near real time, images defined in the electronic signals received from the camera 112. The camera application 222 may be configured to store the images or videos to memory, for example the flash memory 210. The images or image frames may be stored in various formats including JPEG, RAW, bitmap image file (BMP), etc. The camera application 222 may be configured to receive data from one or more image sensors of the camera 112.

The camera application 222 may, in various embodiments, determine and/or control any one or more of a number of camera related features, options or settings including, for example, the flash 206, a digital zoom feature (which may crop an image to a centered area with the same aspect ratio as the original), an image stabilization feature, a shutter speed, a camera lens aperture, a focal length, high dynamic range settings such as a long exposure time and a short exposure time, a white balance setting and other camera configuration settings. In some embodiments, the focal length may be adjusted by lens movement. Lens movement contributes to focusing a scene or object onto an image sensor. At least some of the features may be automatically determined by the camera application 222. That is, at least some of the above mentioned settings may be determined without direct user input setting such settings.

While the example discussed above includes a processor 202 coupled with a camera application 222 which collectively act as an image signal processor to provide image related functions, in some other embodiments (not shown), another processor, such as a dedicated image signal processor, may provide some or all of these functions. That is, an image signal processor may be configured to perform the functions of the camera application 222 or a portion thereof.

For example, the camera 112 may be a digital camera provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as a Serial Peripheral Interface (SPI) or Inter-Integrated Circuit (I2C) interface for connecting to a printed circuit board (PCB) of the electronic device 110. The controller provided on the IC may be configured to perform some or all of the features of the methods described herein.

While the camera application 222 has been illustrated as a stand-alone application, in at least some embodiments, the functions of the camera application 222 may be provided by a plurality of software modules.

In some embodiments, functions of the camera 112 may be provided by applications separate from or in addition to the camera application 222. For example, a security marker detection application 224 may, in various embodiments, detect security markers displayed by a display device 120. That is, the processor 202 may be coupled with a security marker detection application 224 which may collectively act as an image signal processor to perform some or all of the features of the methods described herein.

Further, while the memory stores processor-executable instructions 220 has been illustrated using a block that is separate from the processor 202, in practice, the memory storing the processor-executable instructions 220 may be provided on-board the processor 202. That is, the processor 202 may include internal memory and the processor-executable instructions 220 may be provided on the internal memory.

In some embodiments, the electronic device 110 may include a secure chip 216. The secure chip 216 may be a memory chip that may not be written to by standard processor-executable instructions 220. That is, the secure memory chip may include information that is unique to the electronic device 110 and that may have been written to the secure chip 216 at the time that the electronic device 110 was manufactured and/or assembled. For example, the secure chip 216 may store information for authenticating the electronic device 110. In another example, the secure chip 216 may store unique identifying information about the electronic device 110.

In some embodiments, the electronic device 110 may include a communication subsystem 218. For example, the communication subsystem 218 may be a wireless subsystem or a wired subsystem for communicating with a network 130.

The particular design of the communication subsystem 218 depends on the network 130 in which the electronic device 110 is intended to operate. In some embodiments, the network 130 may include one or more of a Wireless Wide Area Network (WWAN) and/or a Wireless Local Area Network (WLAN) and/or other suitable network arrangements. In some embodiments, the electronic device 201 is configured to communicate over both the WWAN and WLAN, and to roam between these networks. The electronic device 110 may send and receive communication signals over the network 130 via the communication subsystem 218 after network registration or activation procedures have been completed.

In some embodiments, the communication subsystem 218 may include a receiver, a transmitter and associated components, such as one or more antenna elements, local oscillators, and a processing module such as a digital signal processor. The antenna elements may be embedded or internal to the electronic device and a single antenna may be shared by both receiver and transmitter. The particular design of the communication subsystem 218 may depend on the network 130 to which the electronic device 110 is intended to operate with.

The electronic device 110 may communicate with any one of a plurality of fixed transceiver base stations of a network 130 within its geographic coverage area. Signals received by an antenna through the network 130 may be input to a receiver, which may perform receiver functions as signal amplification, frequency down conversion, filtering, channel selection, etc., as well as analog-to-digital (A/D) conversion. A/D conversion of a received signal allows more complex communication functions such as demodulation and decoding to be performed in a digital signal processor. In a similar manner, signals to be transmitted are processed, including modulation and encoding, for example, by a digital signal processor. Digital signal processed signals may be input to a transmitter for digital-to-analog (D/A) conversion, frequency up conversion, filtering, amplification, and transmission to the network 130 via an antenna. A digital signal processor may not only process communication signals, but may also provide for receiver and transmitter control. For example, the gains applied to communication signals in a receiver and a transmitter may be adaptively controlled through automatic gain control algorithms implemented in a digital signal processor.

The electronic device 110 may include other components apart from those illustrated in FIG. 2. By way of example, the electronic device 110 may include or is connectable to a power source such as a battery. The battery may be one or more rechargeable batteries that may be charged, for example, through charging circuitry coupled to a battery interface. The battery may provide electrical power to at least some of the electrical circuitry in the electronic device, and the battery interface may provide a mechanical and electrical connection for the battery. The battery interface is coupled to a regulator which provides power V+ to the circuitry of the electronic device 110.

Reference is now made to FIG. 3, which is an illustration of a sequence diagram 300 for providing media content and a security marker by a display device 120. For example, FIG. 3 illustrates an example of a stream of media content frames 310 that may be overlaid with security marker frames 320. Each media content frame in the stream of media content frames 310 may be provided or displayed by the display device 120 at a first frequency. For example, the first frequency may be a refresh rate of the display device 120. Further, the security marker frames 320 may be provided or displayed by the display device 120 at a second frequency. In some embodiments, the first frequency may be greater than the second frequency such that a select number of media content frames 310 may be overlaid with security marker frames 320. In some embodiments, the security marker frames 320 may be embedded or incorporated into the media content frames 310 themselves.

As described above, the frequency at which the security marker frames 320 are provided may be less than the frequency at which the media content frames 310 are provided such that the periodically displayed security marker frames 320 are undetectable by a human eye viewing the display device 120. That is, the security marker frames 320 may be interleaved into media content frames 310 being displayed by the display device 120 at a refresh rate frequency, such as the first frequency.

In some embodiments, while the security marker frames 320 may be interleaved into media content frames 310 such that the security marker frames 320 may be undetectable by an unaided human eye viewing the display device 120, the security marker frames 320 may be detectable by an image sensor associated with a camera 112 of the electronic device 110. In some embodiments, periodically displayed security marker frames 320 may be used to provide security related information according to methods and devices described herein.

Based on the media content frames 310 and the security marker frames 320, a display device 120 may be able to convey information to an electronic device 110 through a mechanism that is undetectable or imperceptible to an unaided human eye. That is, a user 102 may not be able to detect information being conveyed by the security marker frames 320 without the use of the electronic device 110.

Figure 4A:
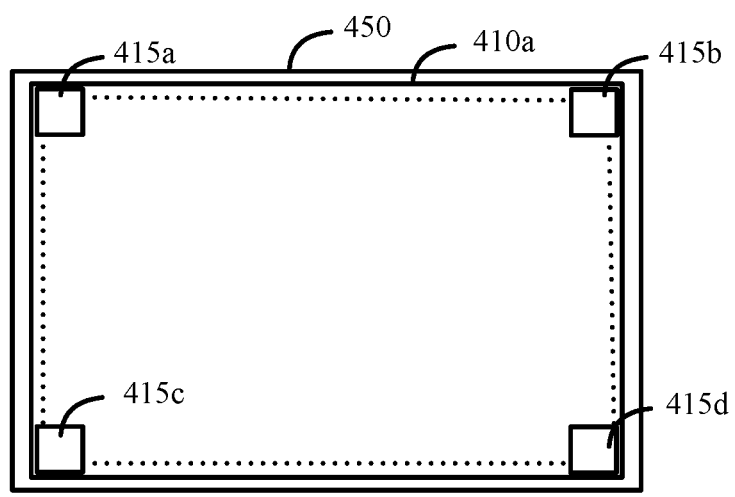
FIGS. 4A, 4B, and 4C are illustrations of captured images based on fields of view as viewed by an electronic device in accordance with example embodiments of the present disclosure.
Figure 4B:
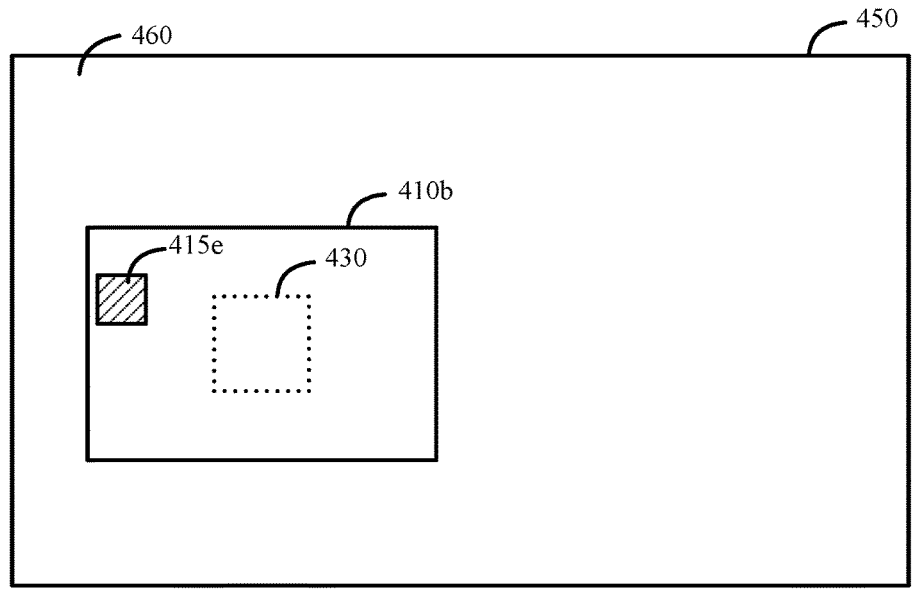
Figure 4C:
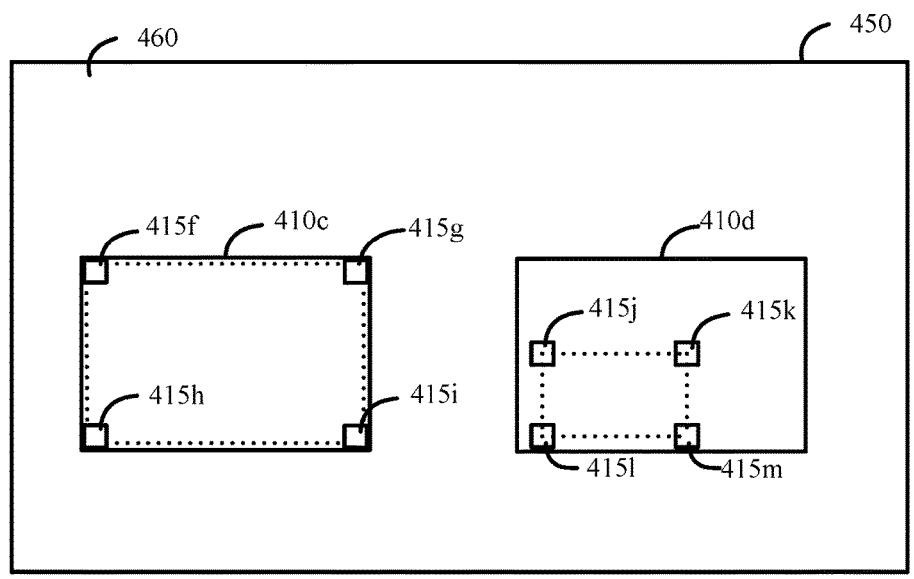

Reference is now made to FIGS. 4A, 4B, and 4C, which illustrate example captured images 450 associated with a field of view 114 as seen by an electronic device 110. For example, the captured image 450 may be based on image data detected by an image sensor of a camera 112.

In some embodiments, a display device 120 may have a display surface 410a, 410b, 410c, 410d. For ease of explanation, the display surface 410a, 410b, 410c, 410d may generally be described as the display surface 410.

As illustrated in FIGS. 4A, 4B, and 4C, in some embodiments, the display surface 410 of a display device 120 may be within a portion of a field of view 114. That is, the user 102 may operate the electronic device 110 at various distances from the display device 120. Based on the distance between the electronic device 110 and the display device 120, the display surface 410 may occupy greater or lesser portions of the field of view 114. For example, when the electronic device 110 is nearer to the display device 120, the contents of the display device 120 may occupy a larger portion of the captured image 450. When the electronic device 110 is further away from the display device 120, the contents of the display device 120 may occupy a smaller portion of the captured image 450.

Referring now to FIG. 4A, an example captured image 450 is shown when contents displayed on a display surface 410a occupies a substantial portion of the field of view 114. That is, the electronic device 110 may be positioned sufficiently near the display device 120 such that the display surface 410a occupies substantially the entire field of view 114. When the field of view 114 is occupied by the display surface 410a, the captured image 450 may include the content being displayed on the display surface 410a.

In some embodiments, the display surface 410 may occupy a less than full portion of the captured image 450. Referring to FIG. 4B, an example captured image 450 is shown when the display surface 410b occupies a less than full portion of the field of view 114. For example, compared to FIG. 4A, in FIG. 4B, the electronic device 110 may be positioned further away from the display device 120 such that the field of view 114 may include the display surface 410b and a background scene 460.

In another example, the electronic device 110 may be configured to adjust focal length settings by re-positioning a lens of a camera 112. Adjusting the focal length setting of the camera 112 may alter the field of view 114 such that the field of view 114 may include the display surface 410b and the background scene 460. For ease of illustration, the background scene 460 is illustrated as a plain background.

In some embodiments, content from two or more display surfaces 410 may occupy portions of the captured image 450. Referring to FIG. 4C, an example captured image 450 is shown when two distinct display devices 120 may occupy the field of view 114 of an electronic device 110. For example, similar to the environment of FIG. 4B, the electronic device 110 may be positioned away from the display devices 120 such that the field of view 114 may include a display surface 410c from a first display device 120, a display surface 410d from a second display device 120, and a background scene 460. When the display surfaces 410c, 410d and the background scene 460 occupy the field of view 114, the captured image 450 may consist of contents displayed on the display surfaces 410c, 410d and also content of the background scene 460.

As illustrated in FIGS. 4A, 4B, and 4C, a captured image 450 may include one or more security markers 415a to 415m. For ease of exposition, the security markers 415a to 415m may generally be described as security markers 415. As described with reference to FIG. 3, the one or more security markers 415 may be periodically provided by security marker frames 320.

In some embodiments, security markers 415 may be a distinct shape discernible from contents being displayed by a display device 120. For example, security markers 415 could be circular or rectangular in shape. In some embodiments, security markers 415 may be a distinct shape with a colour distinguishable from contents being displayed by a display device 120. In some embodiments, security markers 415 may be patterns, such as quick response (QR) codes. A pattern may be a coded pattern, such as a two-dimensional barcode, that contains information about contents being displayed by a display device 120.

In some embodiments, one or more security markers 415 may not be associated with any boundary or may not be associated with any group of security markers 415. For example, one or more security markers 415 may simply be displayed by a display device 120 to provide an indication that the display device 120 may be displaying content associated with a security marker 415. An electronic device 110 may detect the security marker 415 and may perform some action or function in response to detecting the displayed security marker 415. Accordingly, the one or more security markers 415 may not need to be associated with defining a security boundary.

In some embodiments, two or more security markers 415 may be displayed by a display device 120. As will be apparent, in some embodiments, two or more security markers 415 may be associated with a group of security markers 415 for defining a security boundary.

In some embodiments, security markers 415 may be located at peripheral edges or corners of a display surface 410. As will be described, where two or more security markers 415 are associated with image data captured by an electronic device 110, the electronic device 110 may determine a security boundary based on the location of the two or more security markers 415. For example, referring to FIG. 4A, four security markers 415 are illustrated. The four security markers 415 is associated with a corner of the display surface 410a. In some embodiments, the electronic device 110 may determine a security boundary by joining the security markers 415 with lines. For example, in FIG. 4A, the electronic device 110 may determine that the display surface 410a is within a determined security boundary defined by the security markers 415a, 415b, 415c, 415d, illustrated with hashed lines.

In some embodiments, the electronic device 110 may determine that a security boundary circumscribes a portion of a display surface 410 that is less than the entire display surface 410. For example, referring to FIG. 4C, the captured image 450 includes contents from a first display surface 410c and a second display surface 410d. The contents from the display surface 410d may be associated with security markers 415j, 415k, 415l, 415m. As illustrated in FIG. 4C, the security markers 415j, 415k, 415l, 415m may not be located at corners of the display surface 410d. The electronic device 110 may determine a security boundary by joining the security markers 415j, 415k, 415l, 415m with lines. Accordingly, the electronic device 110 may determine that a portion of the display surface 410d is within the determined security boundary defined by the security markers 415j, 415k, 415l, 415m. Although the examples describe security boundaries that are substantially rectangular in shape, security markers 415 may define security boundaries that are circular in shape, triangular in shape, or any other polygon shape.

In some embodiments, the electronic device 110 may determine a security boundary based on one security marker 415, such as a coded pattern. For example, referring to FIG. 4B, the electronic device 110 may determine a security boundary based on one security marker 415e. When one security marker is associated with the contents of the display surface 410b, the electronic device 110 may be unable to determine a security boundary by joining multiple security markers 415 with lines. In some embodiments, the security marker 415e may be a coded pattern. The electronic device 110 may decode the coded pattern and, based on information from the coded pattern, may determine a security boundary associated with contents of the display surface 410b. In some embodiments, the coded pattern may provide information defining characteristics of the security boundary.

For example, based on information from the coded pattern, the electronic device 110 may determine that a security boundary 430 has a square shape and is located in the center of the display surface 410b. That is, information from the coded pattern may provide a detailed specification for the security boundary 430.

In another example, contents of a display surface 410 may be associated with two security markers 415. In some embodiments, the electronic device 110 may join the two security markers 415 with a line and extrapolate the line so as to divide the display surface 410 into two portions. That is, an identified security boundary may be a boundary dividing the display surface 410 into two distinct portions.

As previously described, content of a field of view 114 of an electronic device 110 may depend on the distance between the electronic device 110 and a display device 120 and/or may depend on the focal length setting of the camera 112 associated with the electronic device 110. When the electronic device 110 is setup so that the content of a display surface 410 occupies the entire field of view 114 (see e.g., FIG. 4A), the electronic device 110 may capture image data and generate a captured image 450 having the content of the display surface 410 occupying the area of the captured image 450. When the electronic device 110 is setup so that the content of the display surface 410 occupies a portion of a field of view 114 (see e.g., FIGS. 4B and 4C), the electronic device 110 may capture image data and generate a captured image 450 having the content of the one or more display surface 410 and a background scene 460.

In some embodiments, when a security marker 415 is a coded pattern, an electronic device 110 may determine one or more boundaries associated with image data based on the decoded security marker 415. In some embodiments, information decoded from the security marker 415 may include absolute information relating to a boundary. For example, referring to FIG. 4B, information decoded from the security marker 415e may specify that a boundary associated with captured image data representing contents of a display surface 410b is a square. The square may have dimensions of 10 centimeters by 10 centimeters and the square may be centrally located in the middle of the display surface 410b.

When the electronic device 110 is setup so that the content of the display surface 410 occupies less than the entire field of view 114, the electronic device 110 may not be able to accurately place a defined security boundary in a generated captured image 450. That is, because the captured image 450 includes content from a display surface 410 and a background scene 460, the absolute information, such as a square dimension of 10 centimeters by 10 centimeters, may not provide sufficiently definite information to an electronic device 110 for placing a boundary in a generated captured image 450. Accordingly, in some embodiments, the electronic device 110 may need to determine a boundary in a captured image 450 based on a combination of decoded information from a security marker 415 and physical dimensions of a displayed security marker 415. As will be apparent, the electronic device 110 may utilize the physical dimensions of the displayed security marker 415 as a baseline for accurately placing a defined boundary in a generated captured image 450.

In an example, referring to FIG. 4B, a display device 120 may display a security marker 415 on a display surface 410b. The security marker 415e may be provided with security marker frames 320 that are periodically overlaid with media content frames 310. In some embodiments, the security marker 415e may be a coded pattern and the electronic device 110 may decode the coded pattern. The decoded information may specify that the security marker 415e may be a square shape and is displayed on the display surface 410b such that the security marker 415e appears on the display surface 410b of a display device 120 as a 5 centimeter by 5 centimeter square. Although display devices 120 may have different specifications and capabilities, a display device 120 may be able to display a security marker 415e, such as a coded pattern, on a display surface 410 with a known physical dimension. For example, when a display device 120 provides security markers 415 in security marker frames 320, the display device 120 may calculate the pixel requirements needed to achieve the actual physical dimensions and may subsequently display the security marker 415e on the display surface 410b. Accordingly, although a 5 centimeter by 5 centimeter square displayed on a 30 inch display monitor may occupy less percentage of the entire display surface 410 than the entire display surface 410 of a 23 inch display monitor, a display device 120 may provide security markers 415 with specified physical dimensions to security marker frames 320 by calculating pixel output requirements.

Referring to FIG. 4B, based on decoding the security marker 415e, the electronic device 110 may determine that a boundary associated with content of the display surface 410b may be located in the center of the display surface 410b having a square dimension of 10 centimeters by 10 centimeters. Knowing that the displayed security marker 415e is being displayed with a square physical dimension of 5 centimeters by 5 centimeters, the electronic device 110 may determine that a physical dimension of 10 centimeters is double the length of a side of the displayed security marker 415e. Accordingly, the electronic device 110 may use the displayed security marker 415e as a baseline for placing a boundary 430 in a captured image 450. Irrespective of what percentage the content of the display surface 410b occupies in the captured image 450, the electronic device 110 may use the known characteristic of the security marker 415e as a guide to place a boundary in a captured image 450.

For example, the security marker 415e may indicate that a square-shaped boundary 430 is to be placed at the center of the display surface 410b and that the square shaped boundary 430 has a 10 centimeter by 10 centimeter dimension. To generate and place the boundary 430 in the captured image 450, the electronic device 110 may need to determine the center of the display surface 410b and place a boundary having physical dimensions (e.g., 10 centimeters by 10 centimeters) that are double the physical dimensions of the security marker 415e (e.g., 5 centimeters by 5 centimeters).

In some embodiments, the coded pattern may include information about the display device 120, such as the display dimensions of the display device 120, the resolution capabilities of the display device 120, or the refresh rate capabilities of the display device 120. In some embodiments, the coded pattern may include information about the location of the one or more security markers being displayed on the display device 120. In some embodiments, the coded pattern may include information about the location of an identified security boundary on the display device 120. That is, the coded pattern may include information about the location of an identified boundary associated with image data captured by the electronic device 110.

In some examples, a select portion of the display surface 410 may occupy the entire field of view 114 of the electronic device 110. For example, the user 102 may position the electronic device 110 to be relatively near a display device 120 such that the field of view 114 may only capture a select portion of the contents of the display surface 410. Referring again to FIG. 4B as an example, if the electronic device 110 is located near the display surface 410b such that the field of view 114 is occupied by contents of the lower right corner of the display surface 410b, although a security marker 415e may be viewable from a display surface 410b, a camera 112 of the electronic device 110 may not detect the security marker 415e. That is, the security marker 415e may not be within the field of view 114 of the camera 112.

Accordingly, in some embodiments, security marker frames 320 may include a plurality of boundary presence markers scattered across each security marker frame 320. That is, in addition to a security marker 415e, security presence markers may be displayed at repeated intervals across the security marker frames 320. Each security presence marker may, for example, be a small circle that may be spaced 100 pixels from an adjacent security presence marker. Accordingly, even though the security marker 415e may not be within a field of view 114 of a camera 112, a processor 202 may determine that image data being captured is associated with a security marker 415e, that the security marker 415e may not be within the field of view 114, and that a security policy may need to be applied.

As apparent from the examples with reference to FIGS. 3, 4A, 4B, and 4C, security marker frames 320 may include one or more security markers 415. A display device 120 may interleave or overlay one or more security marker frames 320 with media content frames 310 for display on a display surface 410. The frequency at which the security marker frames 320 are provided may be less than the frequency at which the media content frames 310 are provided. Accordingly, the security marker frames 320 may be undetectable by a human eye viewing the display device 120. The security marker frames 320, however, may be detectable by a camera of an electronic device 110. Accordingly, a display device 120 may be able to convey information to an electronic device 110 through a mechanism that is undetectable or imperceptible to an unaided human eye.

An electronic device 110 may capture image data using a camera 112 associated with the electronic device. The electronic device 110 may generate a captured image 450 based on the image data. The captured image 450 may present content displayed on one or more display surfaces 410 and one or more background scenes 460 within a field of view 114 of the camera 112. The electronic device 110 may also determine a security boundary associated with the image data captured by a camera 112 of the electronic device 110 and associate the security boundary with a portion of the image data for generating the captured image 450. The security boundary may be based on the one or more security markers 415 provided in security marker frames 320, where the security marker frames 320 are interleaved or overlaid with media content frames 310.

Figure 5:
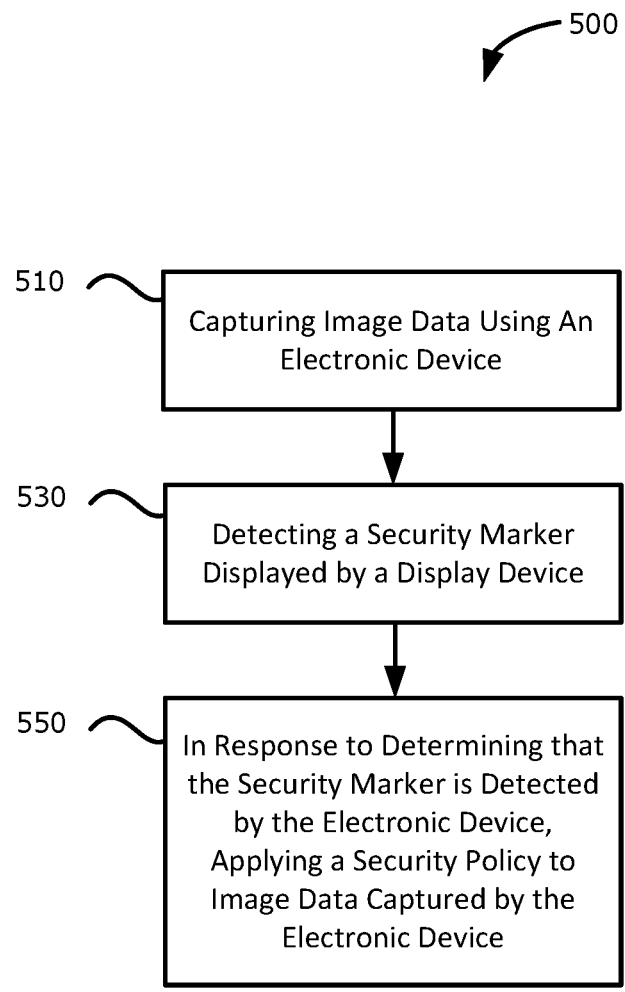
FIG. 5 is a flowchart illustrating an example method of securing image data detected by an electronic device.

Reference is now made to FIG. 5, which is a flowchart illustrating an example method 500 of securing image data detected by an electronic device 110. The method 500 may be performed by an electronic device 110 of the type described above with reference to FIGS. 1 and 2 or a variation of such electronic devices. For example, in at least some embodiments, processor-executable instructions 220, such as a security marker detection application 224, may configure a processor 202 of the electronic device 110 to perform the method 500.

At 510, the method includes capturing image data using the electronic device 110. For example, the processor 202 may capture image data using a camera 112 of the electronic device 110. The camera 112 may be capable of capturing image data, such as images, in the form of still photo and/or motion data. The image data may be generated in the form of an electronic signal which is produced by an image sensor associated with the camera 112.

At 530, based on the captured image data, the processor 202 may detect a security marker 415 displayed by a display device 120. The security marker may be periodically displayed to be undetectable by a human eye that is viewing the display device 120.

In some embodiments, the electronic device 110 may include a database for storing a list of security markers 415 and a list of characteristics associated with each security marker 415 in the list of security markers 415. When the processor 202 captures image data using the camera 112 of the electronic device 110, based on the captured image data, the processor 202 may identify shapes or objects. The processor 202 may compare the identified shapes or objects to security markers 415 contained in the list of security markers 415. For example, when detecting a security marker 415, the processor 202 may utilize pattern recognition methods for identifying security markers 415 being displayed by a display device 120.

In some embodiments, the processor 202 may capture image data using a camera 112 of the electronic device 110 and may generate a captured image 450 by merging image data representing media content frames 310 and image data representing security marker frames 320. That is, the captured image 450 may include image data associated with contents being displayed on a display screen 410, a background scene 460, and security markers 415. To detect a security marker 415, the processor 202 may analyze the captured image 450 and identify predetermined features that may be defined in a database or memory device of the electronic device 110.

In some embodiments, the processor 202 may capture a plurality of image frames. The media content frames 310 or image frames may be displayed by a display device 120 at a first frequency. The security marker frames 320 may be displayed by the display device 120 at a second frequency. The first frequency may be greater than the second frequency. For example, referring again to FIG. 3, the display device 120 may provide security marker frames 320 at a second frequency and the display device 120 may provide media content frames 310 at a first frequency. Relative to the media content frames 310, the security marker frames 320 may be provided periodically. When an unaided eye of a user 102 views the display device 120, the user 102 may not perceive the security marker frames 320. That is, the media content frames 310 may be provided at a higher frequency relative to the frequency of the provided security marker frames 320 such that the periodically interleaved security marker frames 320 are not noticed by the user 102.

A user 102 may operate the electronic device 110 within a line of sight of a display surface 410 of a display device 120. The electronic device 110 may capture image data associated with media content frames 310 and security marker frames 320. Accordingly, the processor 202 may detect one or more security markers 415 displayed by the display device 120 when an unaided human eye may not be able to detect the one or more security markers 415 displayed by the display device 120.

At 550, in response to determining that a security marker 415 is detected by the electronic device 110, the method includes applying a security policy to image data captured by the electronic device 110. For example, the processor 202 may apply a security policy to image data captured by the electronic device 110 when one or more security markers 415 are detected by the processor 202.

As described, in some embodiments, the processor-executable instructions 220 may include one or more camera applications 222. In some embodiments, the one or more camera applications 222 may be third-party applications developed for download and for use on the electronic device 110. For example, a third-party camera application may be an image editing application installed on the electronic device 110. The electronic device 110 may provide a trigger mechanism, such as a user selectable button, for initiating capture of image data by an application on the electronic device 110. For example, the image editing application may be granted access to image data once a trigger mechanism is activated by a user of the electronic device. That is, the image editing application may be granted access to image data for further processing or transmission to other systems. In some embodiments, the trigger mechanism may be a depressible shutter button. In some embodiments, the trigger mechanism may be a virtual icon button provided on a viewfinder or display 208 of the electronic device 110.

In some embodiments, the camera application 222 may be a photo capture application provided on the electronic device 110. The photo capture application may, for example, be configured to provide a viewfinder on the display 208 by displaying, in real time or near real time, images defined in the electronic signals received from the camera 112. The photo capture application may be configured to store the images or videos to memory, for example to the flash memory 210. The photo capture application may be configured to receive data from one or more image sensors of the camera 112.

Figure 6:
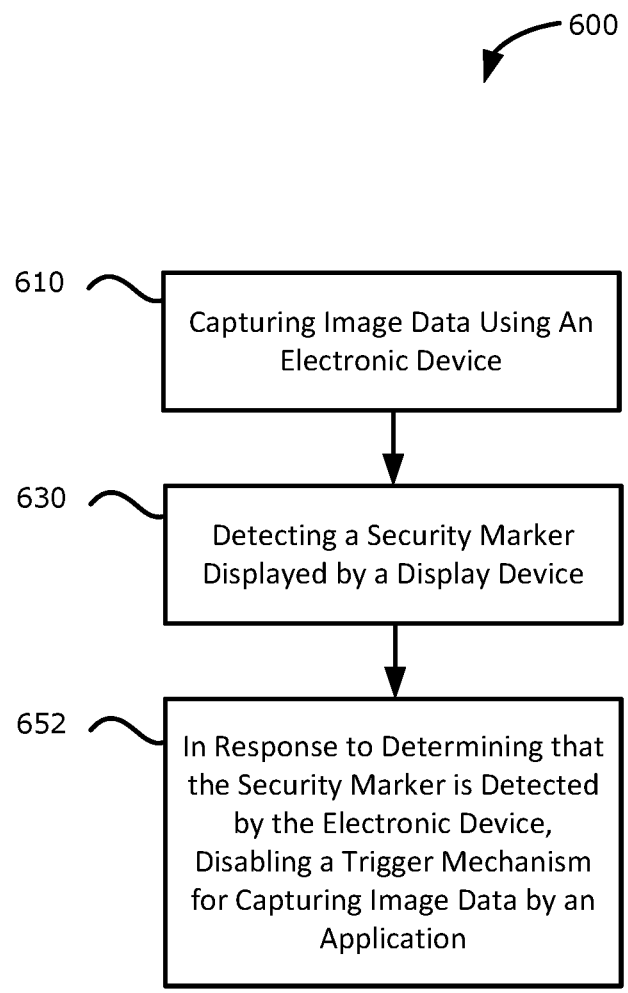
FIG. 6 is a flowchart illustrating an example method of applying a security policy to image data.

Reference is now made to FIG. 6, which is a flowchart illustrating an example method 600 of applying a security policy to image data. The method 600 may be performed by an electronic device 110 of the type described above with reference to FIGS. 1 and 2 or a variation of such electronic devices. For example, in at least some embodiments, processor-executable instructions 220, such as a security marker detection application 224, may configure a processor 202 of the electronic device 110 to perform the method 600.

The method 600 at 610 and 630 may correspond to and may be similar to those of method 500 at 510 and 530, respectively. That is, the processor 202 may capture image data using a camera 112 of the electronic device 110, at 610, and detect a security marker 415 displayed by a display device 120, at 630.

At 652, in response to determining that the security marker is detected by the electronic device, the processor 202 may apply a security policy to image data captured by the electronic device 110. In particular, the processor 202 may disable a trigger mechanism for capturing the image data by an application on the electronic device 110. For example, the processor 202 may disable a trigger mechanism associated with the camera application 222. That is, the processor 202 may not allow the camera application 222 to store images or videos to memory. Similarly, the processor 202 may not allow the camera application 222 to access image data.

In some embodiments, although the camera application 222 may be configured to provide a viewfinder on the display 208 for displaying, in real time or near real time, images defined by electronic signals received from the camera 112, if a trigger mechanism associated with the camera application 222 may be disabled, capturing image data associated with a security marker 415 may be averted.

In another example, the processor 202 may disable a trigger mechanism for accessing image data by applications other than the camera application 222 of an electronic device. For example, processor-executable instructions 220 may include one or more social media applications for sharing data or multimedia photos. When a social media application is launched, the social media application may be configured to display on a viewfinder, in real time or near real time, images defined in electronic signals received from the camera 112. If the processor 202 detects one or more security markers 415, the processor 202 may disable a trigger mechanism associated with the social media application. That is, the processor 202 may not allow the social media application to capture images or videos for transmission or sharing with the associated social media network. Accordingly, at 652, the processor 202 secures image data detected by the electronic device 110. Where image data is associated with a security marker 415, the processor 202 may not allow the detected image data to be accessed, captured, or shared.

Figure 7:
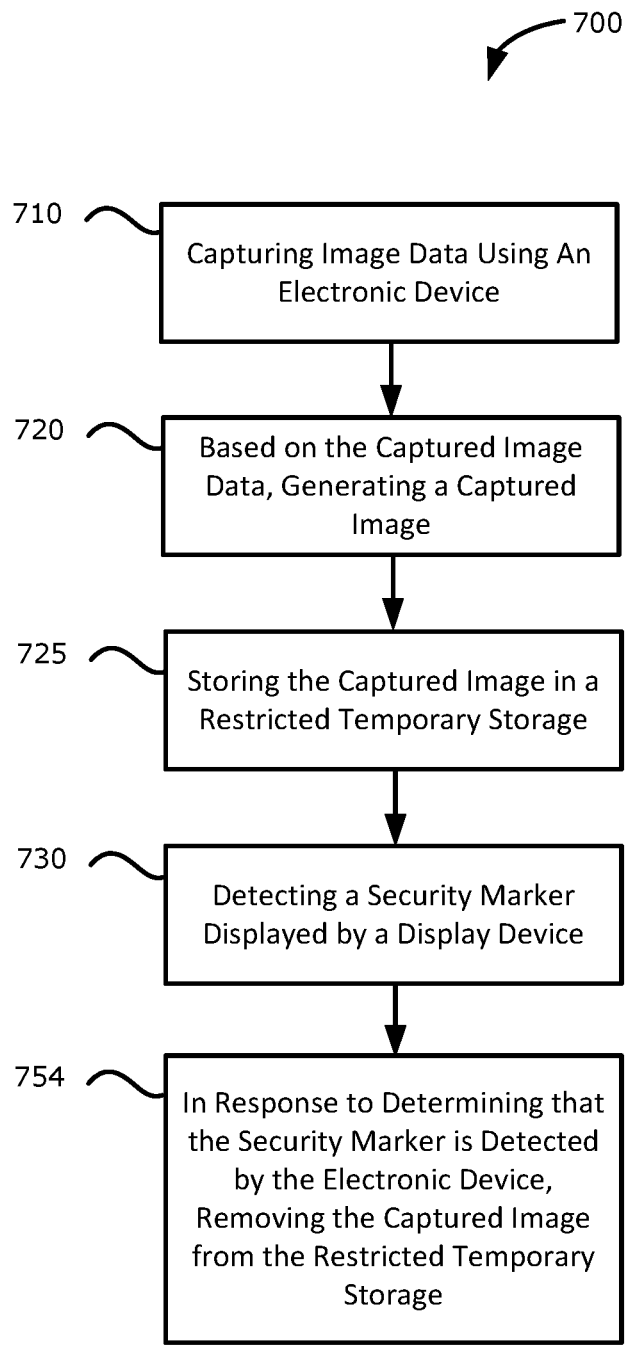
FIG. 7 is a flowchart illustrating an example method of securing image data detected by an electronic device.

Reference is now made to FIG. 7, which is a flowchart illustrating an example method 700 of securing image data detected by an electronic device 110. The method 700 may be performed by an electronic device 110 of the type described above with reference to FIGS. 1 and 2 or a variation of such electronic devices. For example, in at least some embodiments, processor-executable instructions 220, such as a security marker detection application 224, may configure a processor 202 of the electronic device 101 to perform the method 700.

The method 700 at 710 and 730 may correspond to and may be similar to those of method 500 at 510 and 530, respectively. That is, the processor 202 may capture image data using a camera 112 of the electronic device 110, at 710, and detect a security marker 415 displayed by a display device 120, at 730.

At 720, based on the captured image data, the processor 202 may generate a captured image 450. For example, a captured image 450 may be based on image data detected by an image sensor of a camera 112. That is, the captured image 450 may be associated with a field of view 114 as seen by the electronic device 110.

At 725, the processor 202 may store the captured image 450 in a restricted temporary storage. In some embodiments, the restricted temporary storage may be any one of or a combination of flash memory 210, RAM 212, or the secure chip 216. In some embodiments, the captured image 450 may be stored in a restricted temporary storage to allow the electronic device 110 to provide a preview image in a viewfinder. In some embodiments, the captured image 450 may be stored in a restricted temporary storage for the purpose of buffering captured images 450 until a later time when a processor 202 determines that the user 102 of the electronic device 110 or the electronic device 110 is authorized to access the captured image data or the generated captured image. That is, if image data is associated with a security marker 415, the processor 202 may not allow processor-executable instructions 220 to access or manipulate the image data or a generated captured image 450.

As described above, at 730, the processor may detect a security marker 415 displayed by a display device 120.

At 754, the processor 202 may apply a security policy to the captured image data. Applying the security policy to the captured image data may include the processor 202 removing the captured image 450 from the restricted temporary storage.

In some embodiments, if at 754, the processor 202 determines that the captured image data and/or the generated captured image 450 is associated with a detected security marker 415 displayed by a display device 120, the processor 202 may remove the generated captured image 450 from the restricted temporary storage such that the image data and/or the generated captured image 450 may be secured. For example, removing captured image data and/or a generated captured image 450 from a restricted temporary storage may ensure that the contents being displayed on the display device 120 may not be permanently saved or redistributed to unauthorized parties.

In some embodiments, the processor 202 may capture image data using a camera 112. The processor 202 may process the captured image data as temporary data and may use the temporary data for providing a preview on a viewfinder. For example, the processor 202 may capture image data and provide a preview on a viewfinder in real time. The temporary data may not be permanently stored in any component of the electronic device 110. For example, the captured image data may be processed in real-time to provide a preview and be over-written by successively captured image data.

In some embodiments, if the processor 202 does detect a security marker 415 on a display device 120, the processor 202 may disallow storage of the temporary data. In some embodiments, if the processor 202 does not detect a security marker 415 on a display device 120, the processor 202 may allow storage of the temporary data on a memory device of the electronic device 110. For example, if the processor 202 does not detect a security marker 415 on a display device 120, the processor 202 may allow a camera application 222 or any other processor-executable instructions 220 to save the temporary data on a memory device.

Referring again to FIG. 1, in some embodiments, the environment 100 may include a network 130 and a server system 140. The electronic device 110 may send and receive communication signals over a network 130. In some embodiments, the electronic device 110 may transmit messages to a server system 140 over the network 130 and may receive messages from a server system 140 over the network 130. In some embodiments, the server system 140 may act as an administration system for electronic devices 110. For example, a company may issue electronic devices 110, such as mobile telephones, to employees. The company may administer security protocols for the issued electronic devices 110. Accordingly, as described with reference to FIG. 8, in some embodiments, the electronic device 110 may be configured to transmit a message to a third-party, such as a server system 140, when a processor 202 of the electronic device 110 detects a security marker 415 associated with captured image data and/or a captured image 450.

Figure 8:
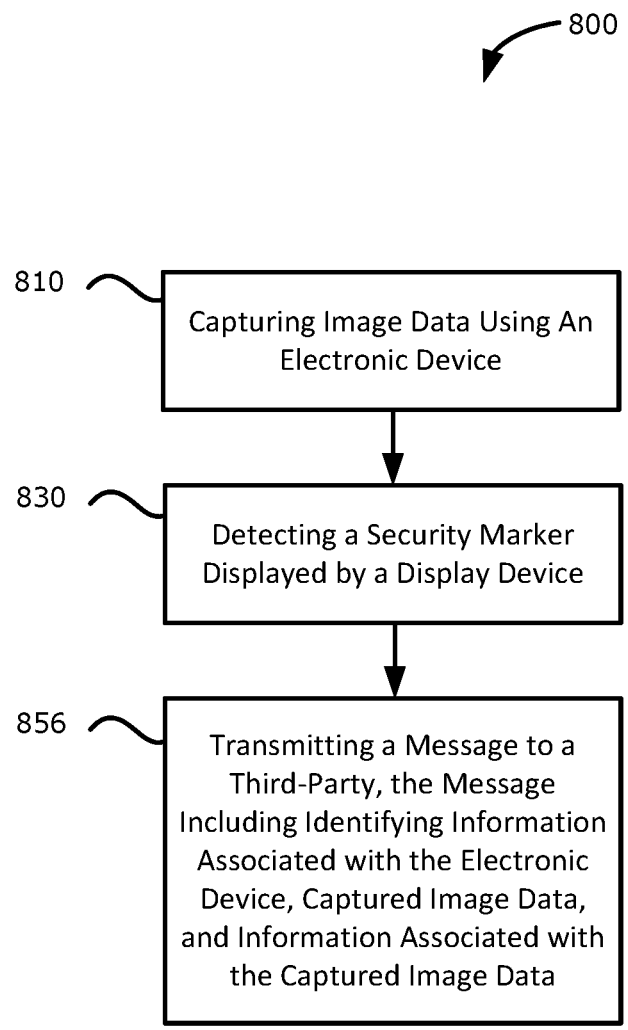
FIG. 8 is a flowchart illustrating an example method of applying a security policy to image data.

Reference is now made to FIG. 8, which is a flowchart illustrating an example method 800 of applying a security policy to image data. The method 800 may be performed by an electronic device 110 of the type described above with reference to FIGS. 1 and 2 or a variation of such electronic devices. For example, in at least some embodiments, processor-executable instructions 220, such as a security marker detection application 224, may configure a processor 202 of the electronic device 110 to perform the method 800.

The method 800 at 810 and 830 may correspond to and may be similar to those of method 500 at 510 and 530, respectively. That is, the processor 202 may capture image data using a camera 112 of the electronic device 110, at 810, and detect a security marker 415 displayed by a display device 120, at 830.

At 856, the processor 202 may apply a security policy to captured image data. Applying a security policy to captured image data may include the processor 202 transmitting a message to a third-party. In some embodiments, the third-party may be a security administrator of the electronic device 110 and the third-party may be operating the server system 140. In some embodiments, the message may include at least one of identifying information associated with the electronic device, the captured image data, and information associated with the captured image data.

In some embodiments, the transmitted message may include information to particularly identify the electronic device 110. For example, a serial number or a unique identifier that may be stored in the secure chip 216 of the electronic device 110 may be transmitted to the server system 140. A unique identifier may provide the server system 140 with information to identify an electronic device 110 that may be attempting to capture images of confidential information being displayed on a display device 120. The security administrator may subsequently choose to contact the user of the electronic device 110 and to discuss security policies relating to photographing confidential information with the user of the electronic device 110.

In some embodiments, the transmitted message may include the captured image data and/or the captured image 450. For example, when the server system 140 receives the captured image data and/or the captured image 450, the server system 140 may analyze the received captured image data and determine whether the data needs to be secured. In some embodiments, a security policy may not necessarily need to be applied to every image data being associated with a security marker 415. Accordingly, the server system 140 may determine whether the received captured image data that is associated with a security marker 415 needs to be secured.

In some embodiments, if the server system 140 determines that the received captured image data needs to be secured, the server system 140 may transmit a message to the originating electronic device 110 and request that the processor 202 of the electronic device 110 apply a further security policy to the flagged image data. Accordingly, the server system 140 may dynamically determine whether image data associated with a security marker 415 needs to be secured.

In some embodiments, the transmitted message may include information associated with the captured image data. For example, the transmitted message may include meta-data associated with the captured image data. For example, the transmitted message may include meta-data associated with the captured image data. Subsequently, the server system 140 may determine, based on the received meta-data, whether the image data needs to be secured. In some embodiments, if the server system 140 determines, based on the received meta-data, that the image data needs to be secured, the server system 140 may transmit a message to the originating electronic device 110 and require that the processor 202 of the electronic device 110 apply a further security policy to the flagged image data.

Figure 9:
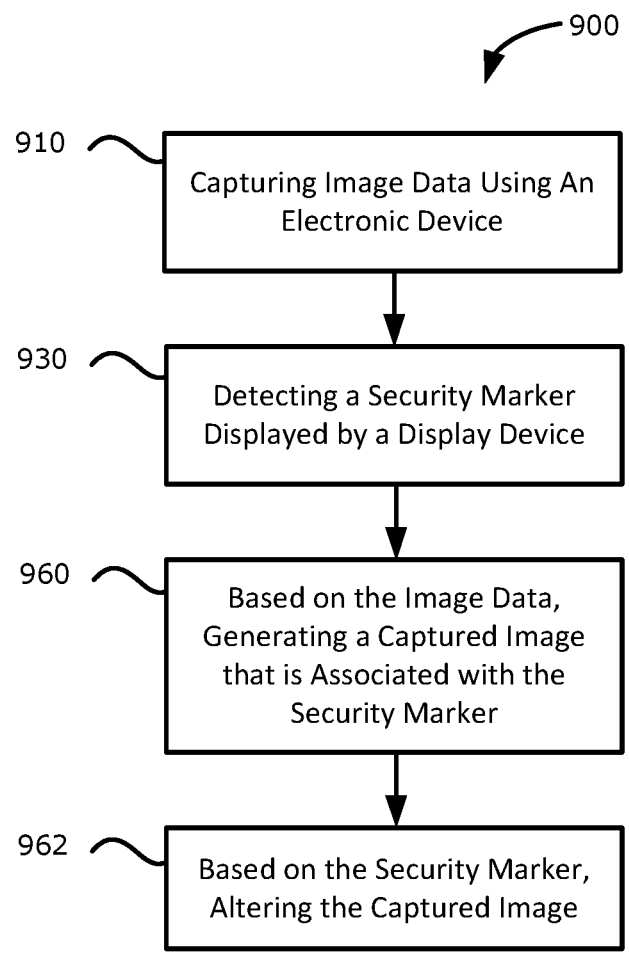
FIG. 9 is a flowchart illustrating an example method of applying a security policy to image data.

Reference is now made to FIG. 9, which is a flowchart illustrating an example method 900 of applying a security policy to image data. The method 900 may be performed by an electronic device 110 of the type described above with reference to FIGS. 1 and 2 or a variation of such electronic devices. For example, in at least some embodiments, processor-executable instructions 220, such as a security marker detection application 224, may configure a processor 202 of the electronic device 110 to perform the method 900.

The method 900 at 910 and 930 may correspond to and may be similar to those of method 500 at 510 and 530, respectively. That is, the processor 202 may capture image data using a camera 112 of the electronic device 110, at 910, and detect a security marker 415 displayed at a display device 120, at 630.

At 960, based on the image data, the processor 202 may generate a captured image 450 that is associated with the security marker 415. For example, a captured image 450 may be based on image data detected by an image sensor of a camera 112. That is, the captured image 450 may be associated with a field of view 114 as seen by the electronic device 110.

At 962, based on the one or more security markers 415, the processor 202 may alter a captured image 450. As will be described below, in some embodiments, altering the captured image includes modifying the captured image to obscure an image portion. In some embodiments, the obscured image portion may be the entire captured image 450. For example, at 962, the processor 202 may obscure the entire captured image so that it may not be discernible to an unaided human eye. In some embodiments, the obscured image portion may be a small portion of the captured image 450. For example, the obscured image portion may generally be a central part of the captured image 450. That is, the obscured image portion may be based on a template requiring that half of the captured image 450 be obscured. In some embodiments, the processor 202 may reduce the number of pixels that may be used for displaying the captured image 450, thus causing the captured image 450 to appear blurry.

Figure 10:
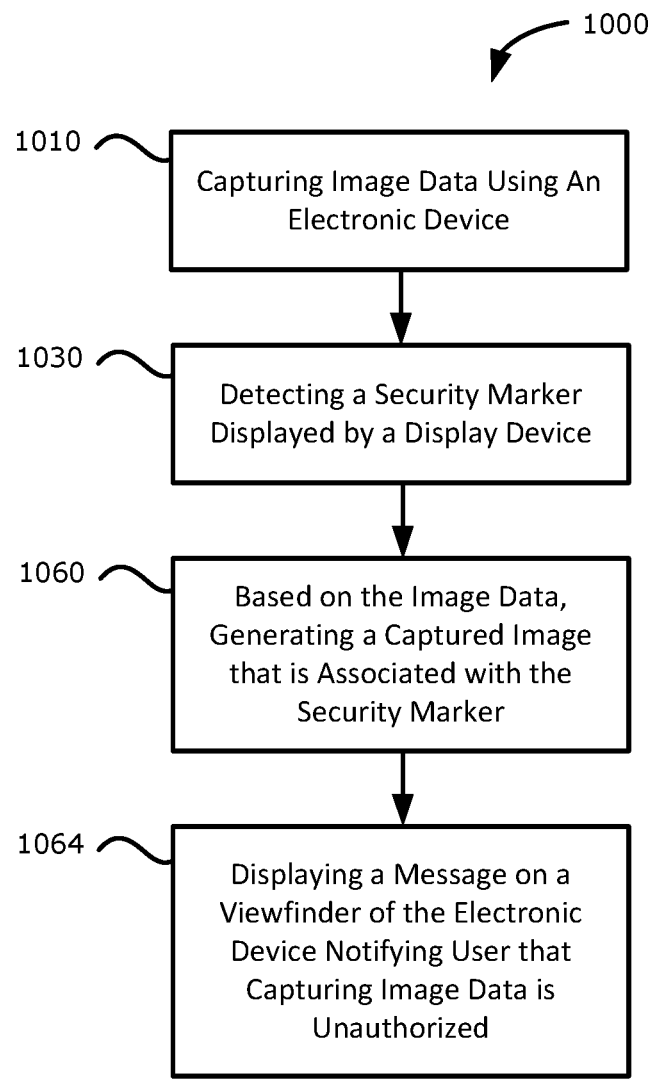
FIG. 10 is a flowchart illustrating an example method of altering a captured image.

Reference is now made to FIG. 10, which is a flowchart illustrating an example method 1000 of altering a captured image. The method 1000 may be performed by an electronic device 110 of the type described above with reference to FIGS. 1 and 2 or a variation of such electronic devices. For example, in at least some embodiments, processor-executable instructions 220, such as a security marker detection application 224, may configure a processor 202 of the electronic device 110 to perform the method 1000.

The method 1000 at 1010 and 1030 may correspond to and may be similar to those of method 500 at 510 and 530, respectively. That is, the processor 202 may capture image data using a camera 112 of the electronic device 110, at 1010, and detect a security marker 415 displayed by a display device 120, at 1030. Further, the method 1000 at 1060 may correspond to and may be similar to that of method 900 at 960. That is, at 1060, based on the image data, the processor 202 may generate a captured image that is associated with the security marker.

At 1064, the processor may alter the captured image 450. Altering the captured image 450 may include the processor 202 displaying a message on a viewfinder of the electronic device 110. The message may notify a user 102 of the electronic device 110 that capturing image data is unauthorized.

In some embodiments, the processor 202 may display the message as an overlay on captured image data or the captured image 450 being previewed on the viewfinder. In some embodiments, the processor 202 may display the message by integrating the message information into the image data or the captured image 450 being previewed on the viewfinder. For example, if the processor 202 detects a security marker associated with captured image data or if the processor 202 detects a security marker associated with a captured image 450, the processor 202 may alter the captured image data or the captured image 450 by including an "unauthorized image data capture" message. In some embodiments, altering the captured image 450 may result in associating the message as a watermark to the captured image data or the captured image 450 to alter the appearance of the captured image 450.

In some embodiments, at 1064, the processor may not alter the generated captured image 450. Instead, the processor 202 may simply display, based on the security marker, a message on a viewfinder of the electronic device 101. In some embodiments, the message may include information associated with the captured image data. That is, in some embodiments, the processor 202 may not generate a captured image 450 from captured image data. Rather, on detecting a security marker 415 being displayed by a display device 120, the processor 202 may simply display a warning message on a viewfinder of the electronic device 110. The message may include information, such as meta-data, associated with the captured image data. For example, the message may describe the image data and may provide a notification that the image data is confidential and cannot be captured.

In some embodiments, the message may provide information to the user 102 of the electronic device 110 relating to how the user 102 may be authenticated or how the electronic device 110 may be authenticated for capturing the image data. Accordingly, in some embodiments, at 1064, altering the captured image 450 or captured image data may include replacing the captured image 450 or captured image data with a message displayable on a viewfinder or display 208 of the electronic device 110.

In some embodiments, a captured image 450 may be altered based on identification of a security boundary. As previously described, in some embodiments, the display device 120 may display a security marker 415 to indicate that any associated image data or captured images 450 may be subjected to a security policy. The display device 120 may display a security marker 415 and the security marker 415 may be a pattern that is coded with discernible information.

In some embodiments, the decoded information may include information relating to the specification and capabilities of the display device 120 that may be providing the media content frames 310 and the security marker frames 320. In some embodiments, the decoded information may include a specification of the boundary that is associated with image data related to media content frames 310. For example, the decoded information may include information relating to the location of the boundary on a display surface. In some examples, the decoded information may specify that a boundary is located in the center of a display surface 410 or at a top left corner of the display surface 410. In some examples, the display surface 410 may be associated with a coordinate grid system and the decoded information may specify the location of a boundary in terms of coordinates in the coordinate grid system.

In some embodiments, the decoded information may contain information related to defined physical features of the security marker 415 as provided on the display device 120. For example, the decoded information may specify that the security marker 415e illustrated in FIG. 4B may be a square shape and may physically appear on the display surface 410b as a 5 centimeter by 5 centimeter square. That is, the display device 120 may calculate the pixel requirements of the display device 120 for providing the actual physical dimension of the security marker 415e on the display surface 410d. For example, because the pixel requirements to display a 5 centimeter by 5 centimeter square on a 30 inch monitor may be different than the pixel requirements to display a 5 centimeter by 5 centimeter square on a 23 inch monitor, a respective display device 120 may be tasked with providing the security marker 415e in accordance with defined physical features.

In some embodiments, the processor 202 may utilize known physical features of the security marker 415e as a baseline for accurately placing a defined boundary in a generated captured image 450.

For example, referring to FIG. 4B, a display device 120 may display a security marker 415e on a display surface 410. An electronic device 110 may decode the security marker 415e and the decoded information may specify that the security marker 415e may be a square shape with physical dimensions of 5 centimeters by 5 centimeters. Further, the decoded information may specify that a boundary associated with content of the display surface 410b may be located in the center of the display surface 410b. Further, the boundary may be a square having a square dimension of 10 centimeters by 10 centimeters. Knowing that the displayed security marker 415e is displayed with a square physical dimension of 5 centimeters by 5 centimeters, the electronic device 110 may associate a square boundary at the center of the display surface 410d having dimensions that are double the dimensions of the security marker 415e. Accordingly, the electronic device 110 may use the displayed security marker 415e as a relative baseline for placing a boundary 430 in a captured image 450.

In another example, the decoded information may specify that a boundary associated with content of the display surface 410b may be located in the center of the display surface 410b. Further, the boundary may be a circle having a radius of 5 centimeters. Knowing that the displayed square security marker 415e is displayed having a side dimension of 5 centimeters, the electronic device 110 may place a circular boundary at the center of the display surface 410b having a radius dimension that is equal in length to a side of the square security marker 415e. Accordingly, the electronic device 110 may use the displayed security marker 415e as a relative baseline for placing a circular boundary (not shown in FIG. 4B) in a captured image 450.

In some embodiments, security marker frames 320 may provide two or more security markers 415, where each of the two or more security markers 415 are coded patterns. In some embodiments, the processor 202 may identify a boundary based on a combination of content circumscribed by two or more security markers 415 and decoded information from the two or more security markers 415. As an illustrative example, referring to FIG. 4C, a processor 202 may decode a pattern associated with the security markers 415j, 415k, 415l, 415m provided on the display surface 410d. The decoded information from the security markers 415j, 415k, 415l, 415m may indicate that a star-shaped boundary (not shown) may be placed within the area circumscribed by the location of the security markers 415j, 415k, 415l, 415m.

Figure 11:
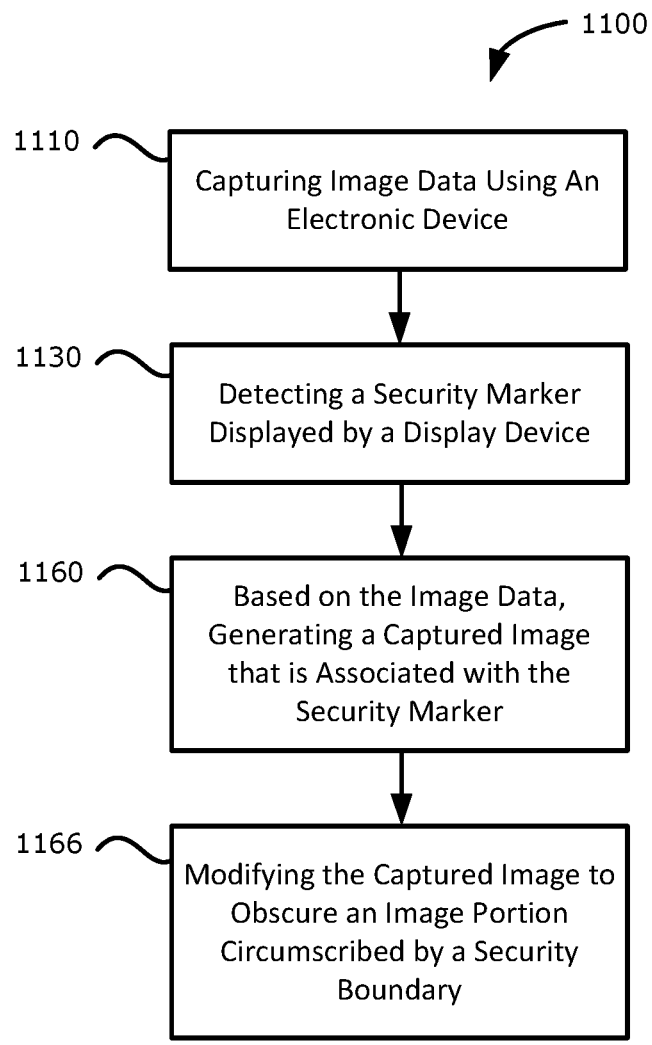
FIG. 11 is a flowchart illustrating an example method of altering a captured image.

Reference is now made to FIG. 11, which is a flowchart illustrating an example method 1100 of altering a captured image. The method 1100 may be performed by an electronic device 110 of the type described above with reference to FIGS. 1 and 2 or a variation of such electronic devices. For example, in at least some embodiments, processor-executable instructions 220, such as a security marker detection application 224, may configure a processor 202 of the electronic device to perform the method 1100.

The method 1100 at 1110 and 1130 may correspond to and may be similar to those of method 500 at 510 and 530, respectively. That is, the processor 202 may capture image data using a camera 112 of the electronic device 110, at 1110, and detect a security marker 415 displayed by a display device 120, at 1130. Further, the method 1100 at 1160 may correspond to and may be similar to that of method 900 at 960. That is, at 1160, based on the image data, the processor 202 may generate a captured image 450 that is associated with the security marker.

At 1166, the processor 202 may alter the captured image 450. Altering the captured image 450 may include the processor 202 modifying the captured image to obscure an image portion circumscribed by a security boundary defined by the security marker. Referring again to FIGS. 4A, 4B, and 4C, the processor 202 may determine that a security boundary circumscribes at least a portion of a display surface 410 that is within a field of view 114. In some embodiments, based on determining a security boundary defined by one or more security markers 415, the processor 202 may modify a portion of the captured image 450 that is circumscribed by the determined security boundary. In some embodiments, the processor 202 may modify the image data circumscribed by the security boundary such that the portion of the captured image 450 circumscribed by the security boundary is no longer discernible to an unaided human eye. For example, the portion of the captured image 450 circumscribed by the security boundary may be blurred out or obscured with an overlaid pattern.

In some embodiments, the processor 202 may modify the image data circumscribed by the security boundary such that the portion of the captured image 450 circumscribed by the security boundary may be information that is discernible to a human eye but is image data that is unrelated to the originally captured image data. That is, the processor 202 may modify the captured image 450 such that confidential information circumscribed by a security boundary is replaced with unrelated or unusable information.

Figure 12:
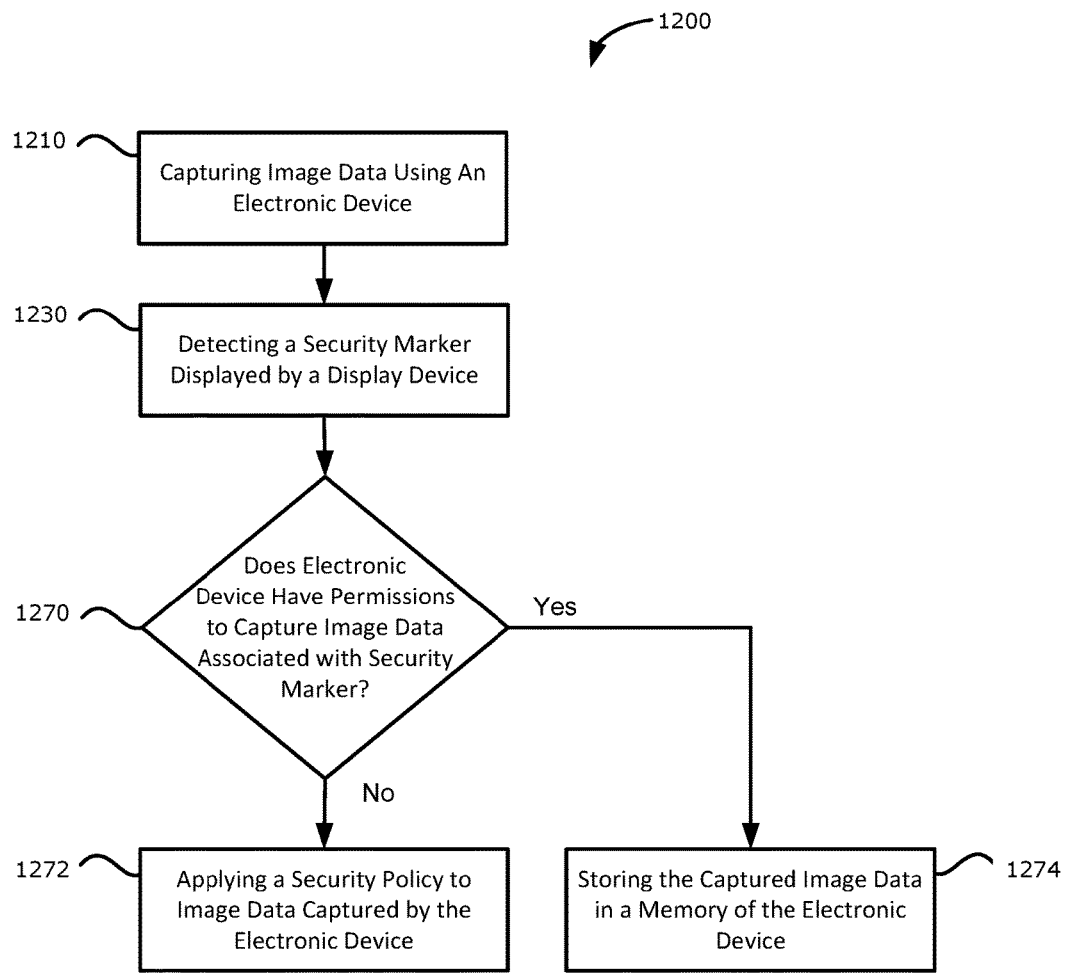
FIG. 12 is a flowchart illustrating an example method of authenticating an electronic device for capturing image data.

Reference is now made to FIG. 12, which is a flowchart illustrating an example method 1200 of authenticating an electronic device 110 for capturing image data. The method 1200 may be performed by an electronic device 110 of the type described above with reference to FIGS. 1 and 2 or a variation of such electronic devices. For example, in at least some embodiments, processor-executable instructions 220, such as a security marker detection application 224, may configure a processor 202 of the electronic device 110 to perform the method 1200.

The method 1200 at 1210 and 1230 may correspond to and may be similar to those of method 500 at 510 and 530, respectively. That is, the processor 202 may capture image data using a camera 112 of the electronic device 110, at 1210, and detect a security marker 415 displayed by a display device 120, at 1230.

At 1270, based on secure data stored at the electronic device 110, the processor 202 may authenticate the electronic device 110 to determine whether the electronic device 110 has permissions to capture image data associated with the security marker 415. In some embodiments, the secure data may be stored at a secure chip 216. For example, the secure data may include a serial number for the electronic device 110 or may include any other type of unique code to identify the particular electronic device 110. In some embodiments, the secure data may be stored on an external memory device, such as a user token key, for identifying the user of the electronic device 110. The user may insert the user token key into an input interface for authentication. In some embodiments, the secure data may include a password. The electronic device 110 may provide an input prompt for requesting a user password and the user password may be used to authenticate the electronic device 110.

If the processor 202 determines that the electronic device 110 does not have permissions to capture image data associated with the security marker 415, at 1272, the processor 202 may apply a security policy to image data captured by the electronic device 110. That is, in response to unsuccessfully authenticating the electronic device 110, the processor 202 may apply a security policy to image data captured by the electronic device 110. The processor 202 may apply a security policy to the image data by performing some or all of the features of the methods described herein. For example, the processor 202 may discard the image data that has been captured by the electronic device 110. If the captured image data was stored in a restricted temporary storage, the processor 202 may remove the captured image from the restricted temporary storage. In another example, the processor 202 may disable a trigger mechanism for disallowing an application on the electronic device from capturing or retrieving image data.

If the processor 202 determines that the electronic device 110 has permissions to capture image data associated with the security marker 415, at 1274, the processor 202 may store the captured image data in a memory of the electronic device 110. That is, in response to successfully authenticating the electronic device 110, the processor 202 may store the captured image data in a memory of the electronic device 110.

As apparent from the foregoing examples, in some embodiments, to protect confidential information or images being displayed on display devices 120 in, for example, an engineering laboratory, media content frames 310 displayed on display devices 120 may also include periodically displayed security marker frames 320. To prevent employees from capturing image data of content displayed on display devices 120 in the confidential environment, the electronic devices 110 issued to employees may be configured to detect a security marker displayed on display devices 120 and, in response to determining that the security marker is detected by the electronic device, the electronic devices 110 may be configured to apply a security policy to image data captured by the electronic device 110.

In some embodiments, an administrator user for the server system 140 may oversee the issuance of electronic devices 110 to employees. For example, the electronic devices 110 could be smartphone devices or tablet devices having one or more cameras 112. The administrator user for the server system 140 may devise a list of issued electronic devices 110 that may be permitted to capture image data associated with a security marker 415. For example, the administrator user may setup electronic devices 110 issued to management level executives (e.g., a chief technology officer) with the ability to capture image data displayed on display devices 120 that may be associated with one or more security marker 415 and image data displayed on display devices 120 that may not be associated with one or more security markers 415. Accordingly, electronic devices 110 may generally be setup to apply a security policy to captured image data when the captured image data is associated with one or more security marker 415. However, in some cases, specific electronic devices 110 issued to specific users may be setup to generally allow the camera 112 to capture image data irrespective of whether the image data is associated with a security marker 415.

In some embodiments, the electronic device 110 may authenticate user of the electronic device 110 or the electronic device 110 on a session-by-session or case-by-case basis. For example, upon detecting that captured image data may be associated with one or more security markers 415, the electronic device 110 display a message on a viewfinder or display 208 of the electronic device 110 requesting a password or secure data be inputted for authentication. Thereafter, the electronic device 110 may be authenticated to capture image data for a limited period of time, for a limited quantity of image data, or for a duration of time until the electronic device 110 may be placed in a locked state or may be powered off.

Although in FIG. 12, at 1270, the processor 202 may authenticate the electronic device 110 after detecting a security marker 415 being displayed by a display device 120, in some embodiments, the processor 202 may authenticate the electronic device 110 before detecting a security marker 415 (e.g., at 1230) such that the electronic device 110 is pre-authorized to capture image data associated with one or more security markers 415.

In some embodiments, in response to determining that a security marker 415 is detected by an electronic device 110, such method 500 at 550, the processor 202 may perform a combination of actions when applying a security policy to image data captured by the electronic device 110. For example, when applying a security policy to image data, a processor 202 may concurrently transmit a message to a third-party, such as a security administrator, and alter image data or obscure a captured image 450.

In some examples, an electronic device 110 may be issued to a user 102 on the condition that the electronic device 110 may not be used for capturing images within an engineering lab. However, if the user 102 attempts to capture images within an engineering lab, an electronic device 110 may be configured to recognize the use of a camera 112, to detect security markers 415 displayed on one or more display devices, and to enforce rules relating to capturing images within an engineering lab. In some embodiments, in response to determining that a security marker 415 is detected by an electronic device 110, the processor 202 may automatically prevent the user 102 from continuing to operate the electronic device 110. That is, the electronic device 110 may automatically power down or enter a locked state. In some embodiments, in response to determining that a security marker 415 is detected by an electronic device 110, the processor 202 may automatically delete data from memory devices of the electronic device 110.

In some embodiments, in response to determining that a security marker 415 is detected by an electronic device, the processor 202 may disable the electronic device 110 and may display a message on a viewfinder of the electronic device 110 prompting the user 102 to speak with an administrator to re-enable the electronic device 110. By prompting the user 102 to speak with an administrator, the administrator may be able to investigate whether use of the electronic device 110 by the user poses any security threat to confidential or non-public information.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a prerecorded storage device or other similar computer readable storage medium including program instructions recorded thereon (which may, for example, cause a processor to perform one or more of the methods described herein), or a computer data signal carrying computer readable program instructions may direct an apparatus to facilitate the practice of the described methods. It is understood that such apparatus, articles of manufacture, and computer data signals also come within the scope of the present disclosure.

The term "computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile/Video Disc (DVD) or Blu-Ray™ Disc, and a solid state storage device (e.g., NAND flash or synchronous dynamic RAM (SDRAM)).

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method of securing an image displayed on an external display device and detected by an electronic device, the method comprising:
   generating image data associated with the detected image using the electronic device;
   detecting, by the electronic device, a security marker displayed by the external display device, the security marker being periodically displayed to be undetectable by a human eye that is viewing the display device;
   in response to detecting the security marker, modifying the image data to obscure an image portion circumscribed by a security boundary defined by the detected security marker; and
   generating a captured image including the obscured image portion for securing the detected image.

2. The method of claim 1, wherein the image displayed on the external display device includes a plurality of image frames, wherein the image frames are displayed by the display device at a first frequency, and wherein the security marker is displayed by the display device at a second frequency, and wherein the first frequency is greater than the second frequency.

3. The method of claim 1, further comprising:
   displaying a message on a viewfinder of the electronic device, the message notifying a user of the electronic device that capturing image data is unauthorized.

4. The method of claim 1, further comprising:
   displaying, based on the security marker, a message on a viewfinder of the electronic device, the message including information associated with the generated image data.

5. An electronic device comprising:
   a camera;
   a memory device; and
   a processor coupled to the camera and the memory device, the processor being configured to:
   generate image data associated with an image displayed on an external display device and detected using the camera;
   detect, using the camera, a security marker displayed by the external display device, the security marker being periodically displayed to be undetectable by a human eye that is viewing the display device;
   in response to detecting the security marker, modify the image data to obscure an image portion circumscribed by a security boundary defined by the detected security marker; and
   generate a captured image including the obscured image portion for securing the detected image.

6. The electronic device of claim 5, wherein the image displayed on the external display device includes a plurality of image frames, wherein the image frames are displayed by the display device at a first frequency, and wherein the security marker is displayed by the display device at a second frequency, and wherein the first frequency is greater than the second frequency.

7. The electronic device of claim 5, wherein the processor is further configured to:
   display a message on a viewfinder of the electronic device, the message notifying a user of the electronic device that capturing image data is unauthorized.

8. A non-transitory computer-readable storage medium comprising processor-executable instructions which, when executed by a processor of an electronic device, causes the electronic device to:
   generate image data associated with an image displayed on an external display device and detected using the electronic device;
   detect, by the electronic device, a security marker displayed by the external display device, the security marker being periodically displayed to be undetectable by a human eye that is viewing the display device;
   in response to detecting the security marker, modify the image data to obscure an image portion circumscribed by a security boundary defined by the detected security marker; and
   generate a captured image including the obscured image portion for securing the detected image.

9. The electronic device of claim 5, wherein the processor is further configured to:
   display, based on the security marker, a message on a viewfinder of the electronic device, the message including information associated with the generated image data.

10. The method of claim 1, wherein the detected security marker includes three or more security markers for defining a security boundary.

11. The method of claim 10, further comprising:
    generating the security boundary based on joining each of the three or more security markers with an adjacent security marker in the three or more security markers; and identifying an interior image portion circumscribed by the generated security boundary as the image portion to obscure.

12. The method of claim 1, wherein the security marker includes a coded pattern encoded with specifications defining the security boundary.

13. The method of claim 12, wherein the coded pattern encoded with specifications defining the security boundary includes a location and dimensions of the security boundary associated with the detected image.

14. The electronic device of claim 5, wherein the detected security marker includes three or more security markers for defining a security boundary.

15. The electronic device of claim 14, wherein the processor is further configured to:
generate the security boundary based on joining each of the three or more security markers with an adjacent security marker in the three or more security markers; and identify an interior image portion circumscribed by the generated security boundary as the image portion to obscure.

16. The electronic device of claim 5, wherein the security marker includes a coded pattern encoded with specifications defining the security boundary.

17. The electronic device of claim 16, wherein the coded pattern encoded with specifications defining the security boundary includes a location and dimensions of the security boundary associated with the detected image.

18. The method of claim 1, wherein modifying the image data includes replacing the image portion circumscribed by the security boundary with unrelated data.

19. The electronic device of claim 5, wherein the processor being configured to modify the image data includes the processor being configured to replace the image portion circumscribed by the security boundary with unrelated data.

* * * * *